April 22, 1941.　　　　B. J. SELHORST　　　　2,239,448
BEATER TOOTH FOR MANURE SPREADERS
Filed April 8, 1940
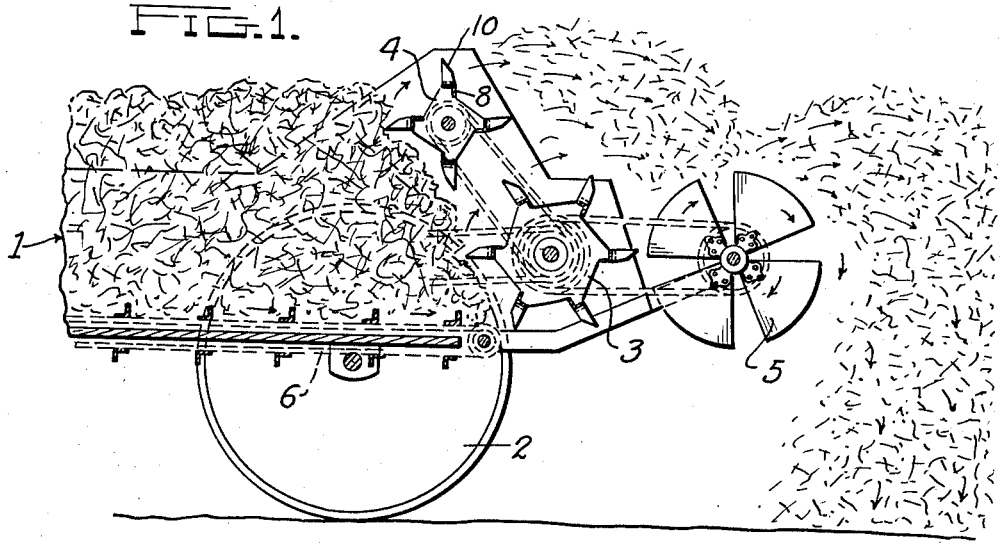
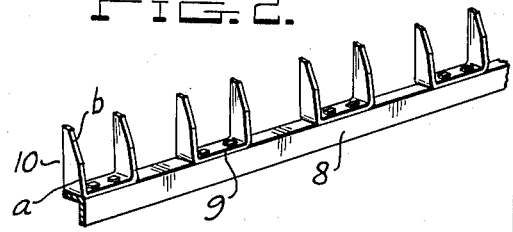
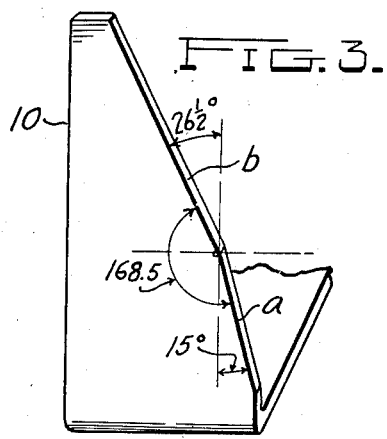
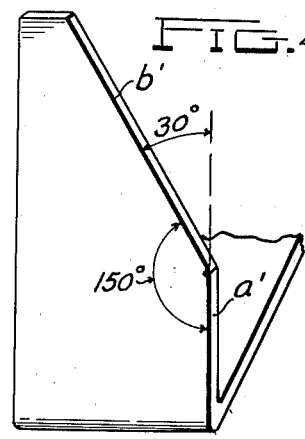
Inventor
Bernard J. Selhorst
By Owen & Owen
Attorneys Patented Apr. 22, 1941

2,239,448

UNITED STATES PATENT OFFICE 2,239,448

BEATER TOOTH FOR MANURE SPREADERS

Bernard J. Selhorst, Coldwater, Ohio

Application April 8, 1940, Serial No. 328,402

4 Claims. (Cl. 275—3)

This invention relates to manure spreaders, and particularly to beater teeth for use in connection therewith.

It is customary, in equipment of this nature, to provide the distributor box at the rear thereof with two rotary beaters, one above and slightly in advance of the other, and to feed the manure rearward to the box by conveyor action into the path of the beater teeth. The beaters rotate in a direction for their teeth to have an upward stripping action on the advancing material, and in addition the teeth are supposed to shred and carry the material upwardly and then rearwardly over the tops of the beaters and to discharge it into the path of rotation of the spreader blades which effect a further breaking up and spreading thereof.

The beater teeth now generally used for such purpose are of spike form, and in at least one machine on the market are of blade-like form, being composed of heavy flat metal stock, with their rear edges straight and disposed substantially radially of the beater axis, and with their leading or working edges straight in planes slightly inclined rearwardly, relative to the direction of revolution, from an intersecting radial line of the beater axis and in a manner to outwardly narrow a tooth. The usual inclination of the leading edge of such a tooth from a line radial to the beater axis is approximately 16°. It is found in practice, however, that while such teeth are efficient in picking up the material, carrying it up and rearwardly over the beater and throwing it into the distributor, they do not have a self-cleaning action. On the contrary, the material, which is of a more or less moist and adherent nature, quickly accumulates and builds up on the teeth, thereby lessening their shredding ability, requiring more power to drive the beater through the advancing material in the box and increasing the liability of rusting of the teeth due to the acid condition of the material adhering thereto.

In attempts to correct this objectionable condition, it has been found that if the angle of inclination of the leading edge of a tooth above-referred to is increased sufficiently for the material to slide outwardly from the tooth during the beating action and thus be self cleaning, it will have a tendency to throw the picked up material forwardly from the beater rather than carrying it up and over the beater and directing it into the distributor.

The object of the present invention is the provision of a beater tooth of the character described, which is of such a form as to not only efficiently clean itself, thus preventing the objectionable accumulation of manure thereon, but also to effectually pick up and deliver the manure from the beater and into the distributor.

The invention is fully described in the following specification, and two embodiments thereof illustrated in the accompanying drawing, in which—

Figure 1 is a side elevation in longitudinal section of a spreader embodying the invention and illustrating the action of the beaters on the material; Fig. 2 is an enlarged fragmentary view of one of the beater bars, with teeth thereon, embodying the preferred form of the invention; Fig. 3 is a perspective view of one of such teeth in detail, and Fig. 4 is a similar view of a slightly modified form of one of such teeth in detail.

Referring to the drawing, 1 designates the distributor box of a manure spreader, which box is supported at its rear end by wheels 2 and has disposed across its rear open end, in the present instance, a pair of beaters 3, 4, one located above and slightly forwardly of the other, and a distributor 5 to which manure is delivered by both beaters, as well understood in the art. The beaters and distributor are suitably driven and all rotate in the same direction, which is clockwise in Fig. 1, or in the direction indicated by the arrows, so that the beater teeth strip the material from the rear end of the advancing pile and carry it upward and rearwardly over the respective beaters and direct it into the distributor. A conveyor 6 operates in the bottom of the box to feed the material rearwardly into the path of the beater teeth.

The beaters 3, 4, are of skeleton form, and provided with a plurality of cross bars 8 spaced outwardly from and parallel to the beater axis. The beater teeth are secured in a row to each of these bars and project outwardly therefrom. These teeth are preferably formed in pairs from heavy flat metal stock shaped to provide U members 9, the legs of which constitute the teeth while the loop portions seat on and are bolted, riveted, or otherwise suitably secured to the bars.

The teeth 10 formed by the leg portions of the members 9 are set, as is customary, with their sides crosswise of the beater bars or parallel to the planes of revolution of the teeth, and the novelty comprising the present invention resides in the form of the leading or beating edges thereof.

The leading edge of each tooth is provided lengthwise thereof with two relatively angled sections $a$ and $b$, which may be termed "hip" and "fore" sections, respectively, and constitute what may be termed material "delivery" and "repelling" sections, respectively, in an operation of the tooth. In the preferred form shown in Figs. 1, 2 and 3, the hip section $a$ is inclined rearwardly and outwardly relative to the direction of revolution at approximately a 15° angle to an intersecting radial line of the beater axis, and the fore section $b$ extends from the outer end of the section $a$ at an increased angle of approximately 26½° to an intersecting radial line of the beater axis. The customary length of a beater tooth is approximately three inches and the section $a$ extends from or near the base of the tooth to near the center thereof, while the section $b$ extends from the outer end of the section $a$ to the outer end of the tooth.

If the leading or beating edge of a tooth, for its entire length, is made at a greater angle than 20° to an intersecting radial line of the beater axis (and in practice the preferred angle in such case is approximately 16°), the tooth will have a tendency to repel or throw the engaged material forward of the machine away from the beater rather than to carry it up and over the beater, as is necessary. It is found, however, that a tooth having a leading edge incline suitable for picking up and delivering the material over the beater and into the distributor is objectionable from the standpoint of accumulation of material thereon. In other words, the angle of inclination is not sufficient to permit a slipping or stripping of all of the material therefrom during operation to render the teeth self cleaning. On the other hand, it is found that if the angle of inclination is sufficient to effect a self cleaning, the desired material delivery action of the beater is not present.

These difficulties have been overcome by providing a tooth on its leading edge at its inner end with a material lifting or delivery section $a$ in a plane relative to a radial line of the beater axis suitable for such purpose, and at its outer end portion with a stripping or cleaning portion $b$ disposed at a suitable inclination to an intersecting radial line of the beater axis for self cleaning purposes. The upright dotted line in Fig. 3 is radial to the beater axis, or at least closely parallel to such a radial line. In other words, in the present showing of the teeth the straight cross line of the tooth base is at right angles to a radial line of the beater.

With the tooth of this form, it is found that the self cleaning tendency or action is not restricted to the outer end portion only of the tooth, but applies to its entire length so that a tooth remains clean as long as it is used. This, as is apparent, not only facilitates the shredding action of the teeth, but requires less power to drive the beater and lessens the liability of rusting of the teeth due to the acidity of the manure, which otherwise might be left adhering to the teeth.

In the form of tooth shown in Fig. 4, the hip portion $a'$ of the front edge is disposed in a radial line of the beater axis, or in close parallel relation to such line, rather than being inclined slightly therefrom as in the preferred form, and the inclination of the fore portion $b'$ is at approximately a 30° angle to such a radial line. This approximate and angular relationship is found preferably if the hip portion $a'$ is in a radial line of the beater axis.

From the foregoing, it is apparent that the hip portion of a tooth edge may vary from a radial line of the beater axis to approximately a 20° angle thereto and that the inclination of the fore portion of such edge may vary from approximately a 24° to such a 32° angle to a radial line. The best results are obtained, however, with substantially the angles shown for the respective forms. It is also apparent that the shape of the rear edge of a tooth relative to its direction of revolution or its disposition with respect to a radial line of the beater axis is not important.

I wish it understood that my invention is not limited to any specific construction, arrangement or form of the parts within the limits noted, but is capable of numerous modifications and changes without departing from the spirit of the claims.

Having thus described my invention, what I claim as new, and desire to secure by United States Letters Patent, is:

1. In a rotary beater of the class described, a beater tooth having a leading beating edge which is angular lengthwise thereof to provide inner and outer sections each of substantial length, the inner section being approximately in a line radial to the beater axis and not more than a rearward incline of 20° therefrom relative to the direction of revolution, and the outer section being disposed in a rearward incline relative to the direction of revolution which is not more than 32° and not less than 24° from an intersecting radial line of the beater axis.

2. In a rotary beater of the class described, a beater tooth having a leading beating edge which is angular lengthwise thereof to provide inner and outer sections each of substantial length, the inner section being approximately in a line radial to the beater axis and the outer section inclining rearwardly therefrom, relative to the direction of revolution, at approximately a 30° angle to such radial line.

3. In a rotary beater of the class described, a beater tooth having a leading beating edge which is angular lengthwise thereof to provide an inner material delivery section and an outer material repelling section during operation of the beater with each section of substantial length, the inner section being inclined rearwardly relative to the direction of revolution at not more than a 20° incline to an intersecting radial line of the beater axis and the outer section being further inclined at not more than a 32° angle from such radial line.

4. In a rotary beater of the class described, a beater tooth having a leading beating edge which is angular lengthwise thereof to provide an inner section the tendency of which during an operation of the beater is to carry the material acted on up and over the beater and to provide an outer section the tendency of which during such operation is to repel or direct the material struck thereby away from the beater, said sections each being of substantial length.

BERNARD J. SELHORST.